United States Patent [19]

Hashimoto et al.

[11] Patent Number: 4,915,438
[45] Date of Patent: Apr. 10, 1990

[54] VEHICULAR SEATING APPARATUS

[75] Inventors: Teruo Hashimoto, Higashihiroshima; Takashi Masuhara, Toyota; Tetsuro Murakami; Yoshinori Murakami, both of Hiroshima; Tetsuya Kameshima, Higashihiroshima, all of Japan

[73] Assignee: Mazda Motor Corporation, Hiroshima, Japan

[21] Appl. No.: 305,609

[22] Filed: Feb. 2, 1989

[30] Foreign Application Priority Data

Feb. 2, 1988 [JP] Japan .................................. 63-21152
Feb. 25, 1988 [JP] Japan .................................. 63-42992

[51] Int. Cl.$^4$ ............................................. B62D 25/10
[52] U.S. Cl. ................................ 296/65.1; 180/89.18; 296/190
[58] Field of Search .......................... 180/89.17, 89.18; 296/65.1, 190

[56] References Cited

U.S. PATENT DOCUMENTS 2,753,947 7/1956 Mach ................................. 180/89.18
3,011,581 12/1961 Wood ................................. 180/89.18
3,125,179 3/1964 Muller ................................ 180/89.18
3,368,840 2/1968 Dangauthier ....................... 296/65.1
4,563,344 1/1986 Iwami ................................. 296/65.1

FOREIGN PATENT DOCUMENTS 59-102532 7/1984 Japan .
61-56124 4/1986 Japan .

Primary Examiner—Robert R. Song
Attorney, Agent, or Firm—Wenderoth, Lind & Ponack

[57] ABSTRACT

A vehicular seating apparatus includes an assistant driver's seat mounted in the interior of a driver cabin of a vehicle and above a service hole on an engine deck raised at a central part of a floor located in the proximity of a driver's seat. The apparatus includes a transverse displacement mechanism for displacing the assistant driver's seat in the transverse direction and a transverse leap-up mechanism for upwardly turning the assistant driver's seat about one end of a seat cushion of the assistant driver's seat located at the side of the driver's seat. A seat frame is provided with a longitudinal slide mechanism for slidably displacing the assistant driver's seat in the longitudinal direction. The apparatus assures that a driver can walk by the side of the assistant driver's seat to reach the rear part of a driver cabin while maintaining good engine service performance. Further, the driver can enjoy excellent driving comfort by virtue of various operations for displacement.

20 Claims, 8 Drawing Sheets

VEHICULAR SEATING APPARATUS

BACKGROUND OF THE INVENTION

1. Field of the Invention

The present invention relates to a vehicular seating apparatus usable for a vehicle such as a cab-over type vehicle or the like including a seat mounted above a service hole of an engine deck raised at the central part of a floor.

2. Prior Art

Many conventional cab-over type vehicles are constructed as follows. Namely, an engine deck including a plurality of wall portions is raised up at the central part of a floor constituting the bottom of a driver cabin, an engine, a radiator and other associated components are arranged below the engine deck, a driver's seat and an assistant driver's seat constituting front seats are arranged in a side-by-side relationship in the direction of the width of the vehicle (hereinafter referred to as the transverse direction), and a service hole is formed in the ceiling portion of the engine deck for the purpose of performing inspection and maintenance for the engine, radiator and so forth. The front seats such as the driver's seat, assistant driver's seat or the like can be turned backwardly or otherwise leaped up or moved up forwardly. When the front seats are displaced in that way, the service hole is exposed to the outside, enabling the engine, radiator and other associated components to be inspected and maintained, as required (refer to, e.g. Japanese Laid-Open Utility Mode NO. 102532/1984).

Recently, such a structure that a driver cabin is united with a cargo room and an assistant driver's seat situated by the side of a driver's seat is eliminated so that a driver can walk directly in the interior of the cargo room without need for him to descend from the vehicle has been employed for some cab-over type vehicles. This type of vehicle is called a walk-through type vehicle which is widely employed as a vehicle for collecting and delivering personal cargos from house to house.

However, the walk-through type vehicle has a drawback that an assistant driver can not ride thereon as an assistant for the driver due to elimination of an assistant driver's seat and thereby the degree of effective utilization of the vehicle is restricted within a substantially reduced range. On the other hand, a conventional cab-over type vehicle including an assistant driver's seat has the drawback that the driver can not enter the interior of the cargo room without the necessity of leaving the vehicle unless he performs an inconvenient operation such as climbing over his seat.

Generally, front seats arranged in the interior of a driver cabin of a vehicle can be adjusted in response to a request by a passenger with respect to their position in the forward/backward direction (hereinafter referred to as the longitudinal direction). In addition, each of the front seats is equipped with a seat belt for the purpose of assuring safety. One end of the seat belt is joined to a seat belt anchor secured to the vehicle at a predetermined position on the floor so that a load exerted on the seat belt is sustained by the floor. However, when the front seats are displaced to adjust their position in the longitudinal direction, the result is that a position which has been occupied by the front seat is relatively offset from the seat belt anchor secured to the predetermined position on the floor of the vehicle, causing the fitting characteristic of the seat belt to be degraded.

To obviate the foregoing problem, there was proposed a seat slide unit as disclosed, e.g. in Japanese Laid-Open Utility Model NO. 56124/1986. The seat slide unit is so constructed that a bracket for fitting a seat belt anchor is secured to the side portion of one of upper rails attached to a seat cushion and slidably engaged with lower rails fixed to the vehicle. U-shaped bent parts are formed on the lower edge of one side portion of the bracket and inverted U-shaped bent parts are formed on reinforcement rails attached to the lower rails to that the inverted U-shaped bent parts are slidably engaged with the U-shaped bent parts formed on the bracket for fitting the seat belt anchor. A relative offsetting of the seat cushion secured to the upper rails from the bracket for fitting the seat belt anchor is eliminated even under a condition that the seat cushion is displaced in the longitudinal direction, by allowing the bracket for fitting the seat belt anchor to be displaced along with the seat cushion when a position to be assumed by the seat is adjusted by displacing the seat cushion in the longitudinal direction while maintaining an improved fitting characteristic of the seat belt. Moreover a load exerted on the seat belt is reliably sustained by the vehicle via both the bent parts.

With respect to a cab-over type vehicle, such a need that displacement of the front seat as mentioned above is multi-directional so as to permit a passenger to move from a driver cabin directly into a cargo room situated behind the driver room hitherto has been raised by users. To this end it is required that displacement of the front seat by multi-directional and that a load exerted on the seat belt is then reliably carried by the vehicle without any degrading of the fitting characteristic of the seat belt of the front seat.

SUMMARY OF THE INVENTION

The present invention has been made with the foregoing background in mind and its object is to provide a vehicular seating apparatus employable for a cab-over type vehicle including an assistant driver's seat mounted sideward of a driver's seat and above a service hole in an engine deck, wherein the apparatus assures that a driver can move by the assistant driver's seat to reach a rear part situated behind a driver cabin while maintaining excellent engine service performance, and moreover that provides good driving comfort, by virtue of multi-directional displacement operations.

Other object of the present invention is to provide a vehicular seating apparatus which assures that displacement of a seat is multi-directional without degradation of a fitting characteristic of a seat belt secured to the seat, and moreover that a load exerted on the seat belt is reliably carried by the vehicle.

To accomplish the above objects, there is provided according to one aspect of the present invention a vehicular seating apparatus including an assistant driver's seat mounted in the interior of a driver cabin of a vehicle and above a service hole in an engine deck raised at the central part of a floor situated sideward of a driver's seat, wherein the apparatus includes a transverse displacement mechanism for displacing the assistant driver's seat in the transverse direction and a transverse leap-up mechanism for upwardly turning the assistant driver's seat about one end of a seat cushion of the assistant driver's seat situated sideward of the driver's seat. The apparatus includes a seat frame which is provided with a longitudinal slide mechanism for slidably displacing the assistant driver's seat in the longitudinal direction.

With this construction, when the assistant driver's seat is displaced toward the driver's seat side by actuating the transverse displacement mechanism, a space of a size equal to the distance of displacement of the assistant driver's seat is provided on the side opposite to the driver's seat, whereby a driver can walk through the open space to reach the rear area of the vehicle located behind the driver cabin. Namely, a cab-over type vehicle having an assistant driver's seat mounted therein can be used in the same fields of utilization as walk-through type panel vans. When the assistant driver's seat is upwardly turned by actuating the transverse leap-up mechanism, the service hole in the engine deck located below the assistant driver's seat is exposed to the outside and thereby inspection can be performed for the engine and so forth from the side which has been occupied by the assistant driver's seat.

In addition, the apparatus also has the function of displacing the seat in the longitudinal direction while maintaining good walk-through performance and good engine service performance and moreover provides excellent driving comfort for a passenger.

Further, there is provided according to other aspect of the present invention a vehicular seating apparatus comprising a seat mounted in the interior of a driver cabin of a vehicle and above a service hole in an engine deck raised at the central part of a floor, a seat frame for the seat and disposed to longitudinally displaceably support a seat cushion for the seat. A pair of fore and rear frame members extend in the transverse direction and a pair of side frame members extend in the longitudinal direction and are connected to opposite ends of the fore and rear frame members. A transverse displacement mechanism engaged with the fore and rear frame members slidably supports the seat cushion in the transverse direction. A transverse leap-up mechanism enables upward turning of the seat about one end of the seat cushion. A seat belt anchor is secured to the seat cushion and an engagement member for the seat belt anchor is slidably received in one of the side frame members.

With the above construction, it is possible to displace the seat cushion not only in the longitudinal direction but also in the transverse direction, whereby displacement of the seat cushion is achieved in a multi-directional fashion. When the apparatus of the invention is employed, e.g. for a cab-over type vehicle, a driver can move from a vehicle cabin directly into the interior of a cargo room situated behind the driver cabin without hindrance or interference due to presence of the driver's seat or the assistant driver's seat, because a seat cushion of a driver's seat and an assistant driver's seat can be displaced in the transverse direction, e.g. toward the central part of a vehicular floor.

Further, since the seat belt anchor to which one end of a seat belt can be connected is secured to the seat cushion and an engagement member associated with the seat belt anchor is slidably received in one of the side frame members of the seat frame, it is possible to ensure a good fitting characteristic of the seat belt when the seat is displaced in the longitudinal direction. When a certain magnitude of load is exerted on the seat belt, the load is effectively transmitted to the side frame member via the engagement member secured to the seat belt anchor. This makes it possible to reliably ensure that the load will be carried by the vehicle.

These and other objects, features and advantages of the present invention will become readily apparent from the following description which is made with reference to the accompanying drawings.

BRIEF DESCRIPTION OF THE DRAWINGS

The present invention will be illustrated in the following drawings in which.

DESCRIPTION OF THE EMBODIMENTS

Now, the present invention will be described in a greater detail hereunder with reference to the accompanying drawings which illustrate preferred embodiments thereof.

Description first will be made with reference to FIGS. 1 to 9 as to a case where a vehicular seating apparatus in accordance with a first embodiment of the present invention is employed for a cab-over type vehicle.

Figure 1:
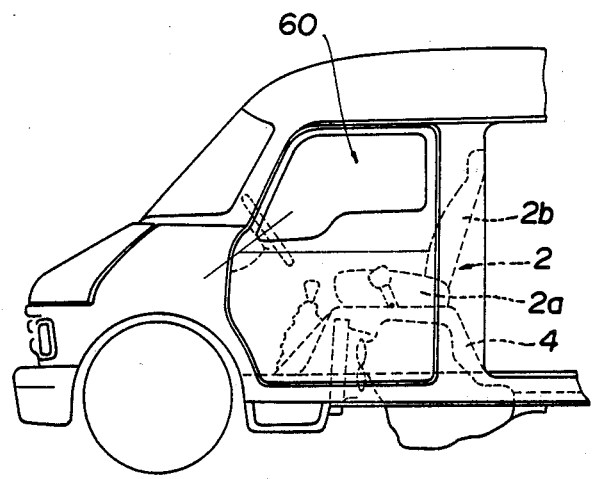
FIG. 1 is a side view of a front part of a vehicle for which a vehicular seating apparatus in accordance with a first embodiment of the present invention is employed.
Figure 2:
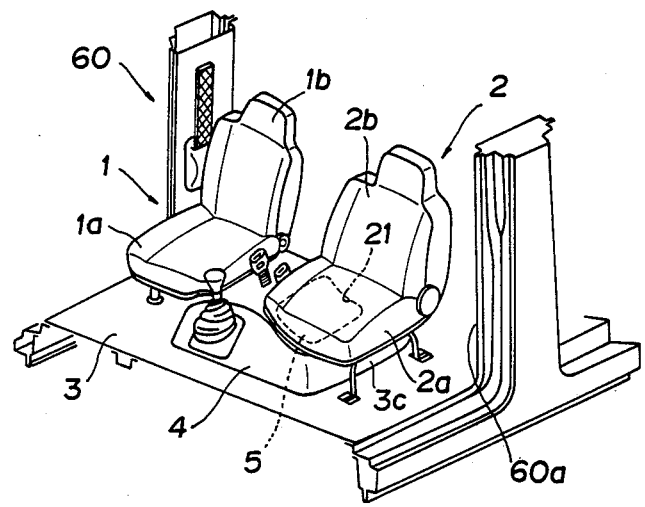
FIG. 2 is a perspective view schematically illustrating the apparatus in accordance with the first embodiment.

FIGS. 1 and 2 schematically illustrate a cab-over type vehicle in which the vehicular sealing apparatus in accordance with the first embodiment is incorporated.

The present invention is basically directed to a vehicular seating apparatus including an assistant driver's seat 2 mounted above a service hole 21 in an engine deck 4 which is raised up from the central part of a floor 3, the engine deck 4 being located sideward of a driver's seat 1 in the interior of a driver cabin 60. The apparatus includes a transverse displacement mechanism for displacing the assistant driver's seat 2 in the transverse direction of the vehicle and a transverse leap-up mechanism for upwardly turning the assistant driver's seat 2 about a pivot which is one end of a seat cushion 2a for the assistant driver's seat.

Figure 3:
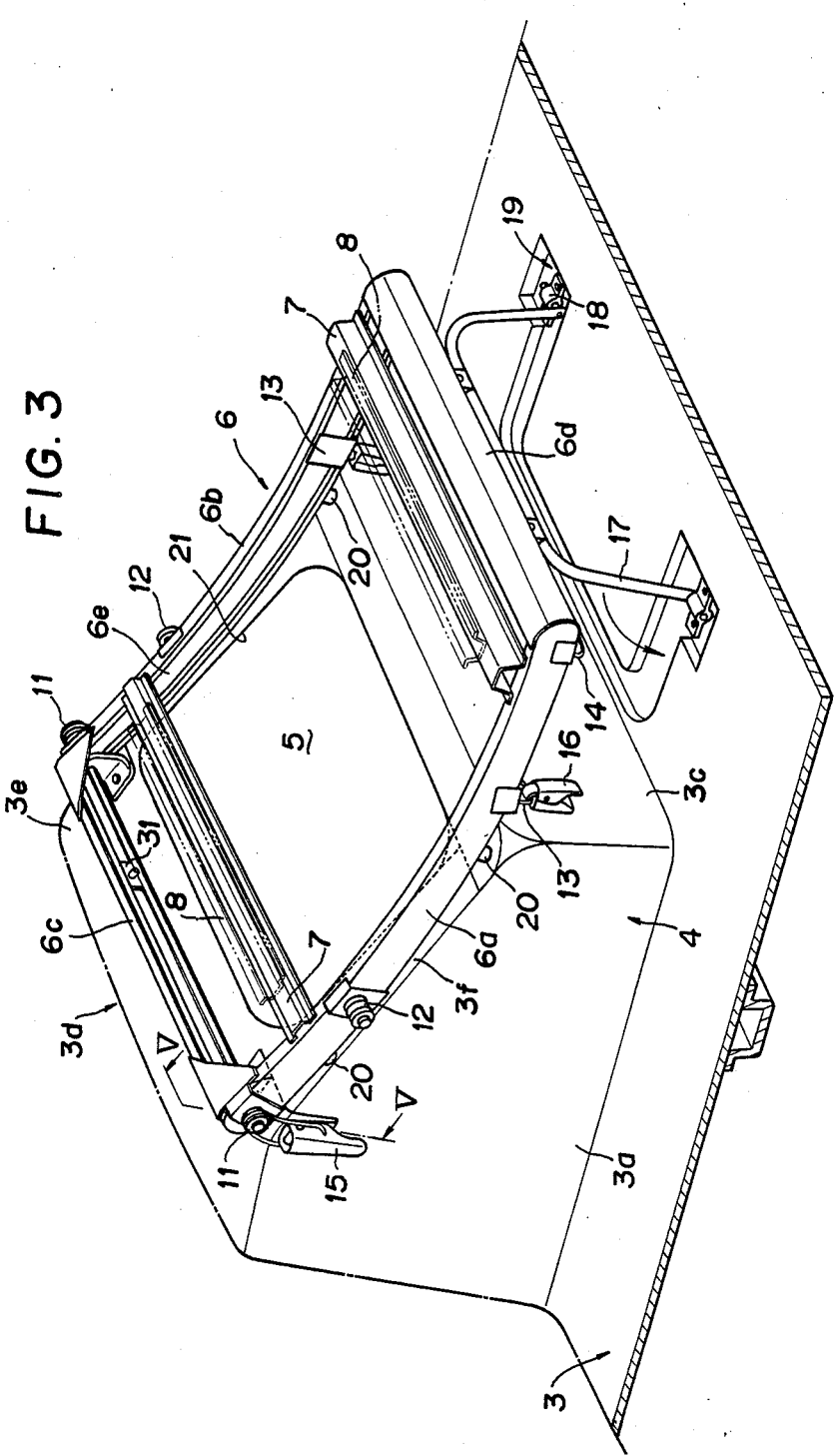
FIGS. 3 to 9 illustrate in more details a transverse displacement mechanism, a transverse leap-up mechanism and a longitudinal slide mechanism which constitute the apparatus in accordance with the first embodiment.
Figure 4:
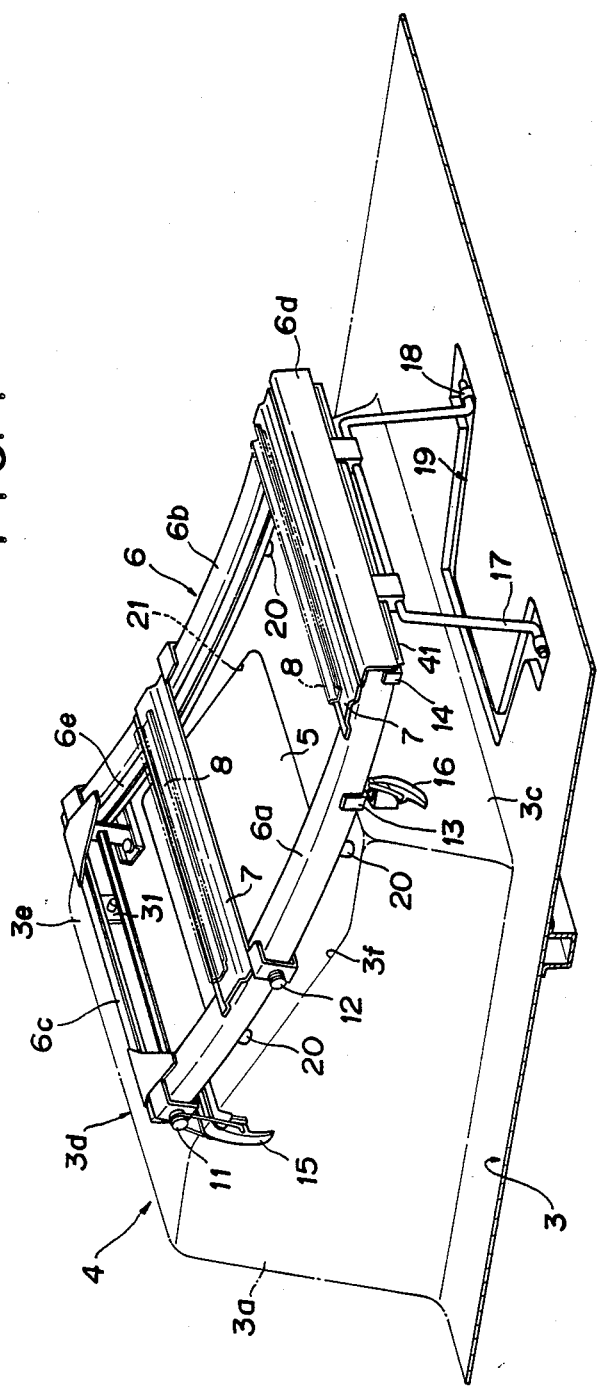
Figure 5:
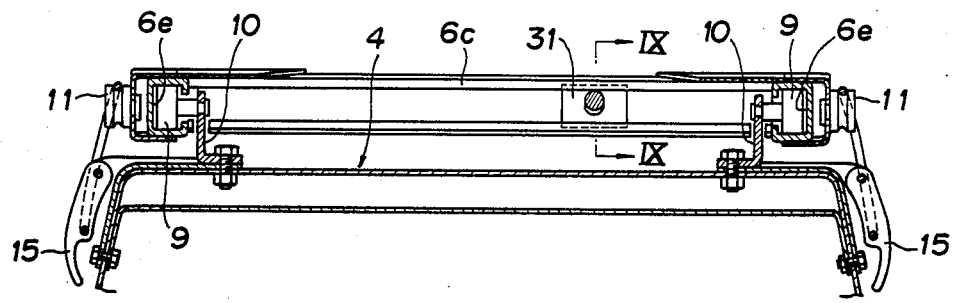
Figure 6:
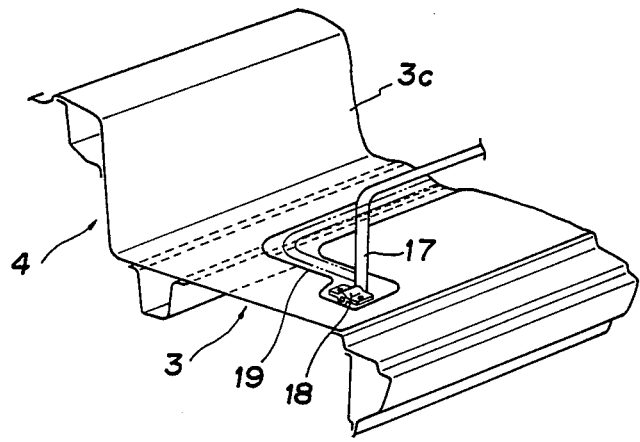
Figure 7:
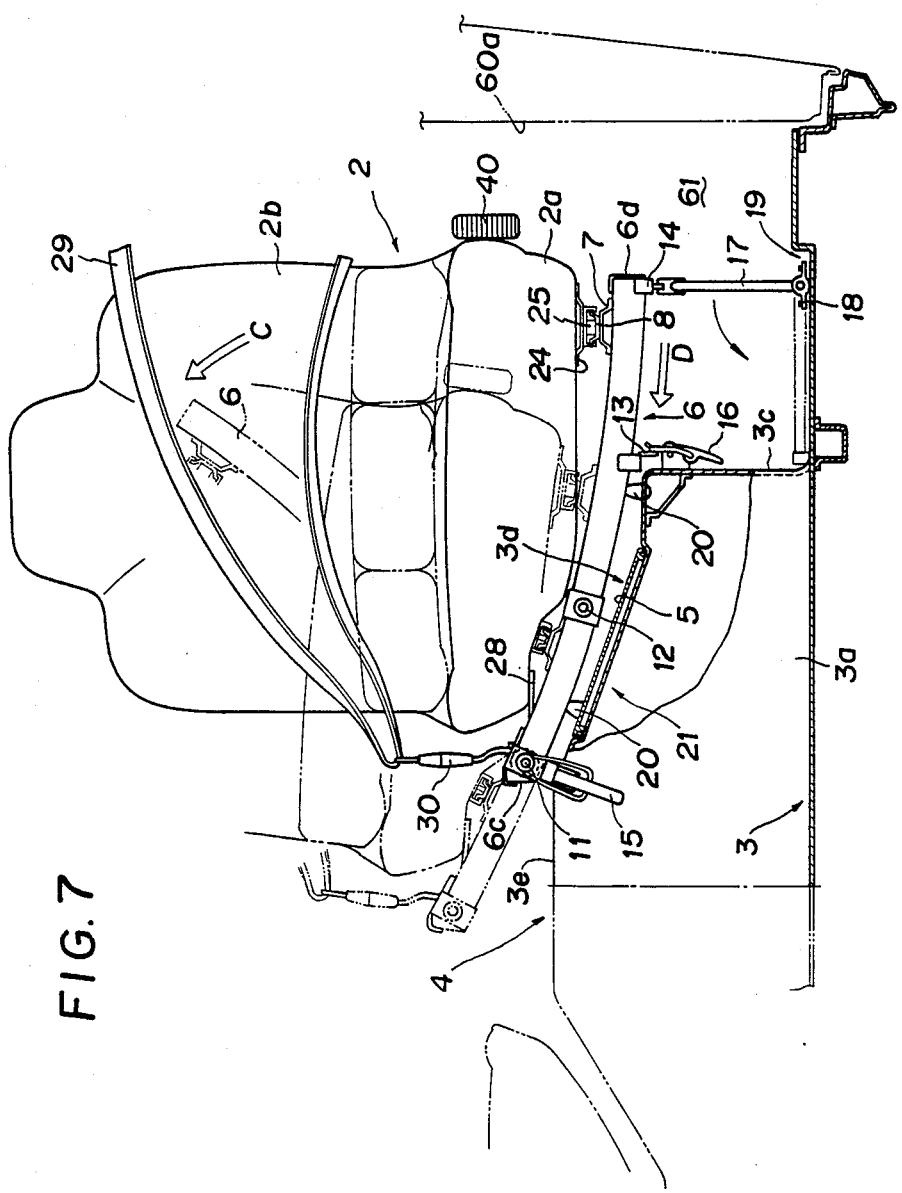
Figure 8:
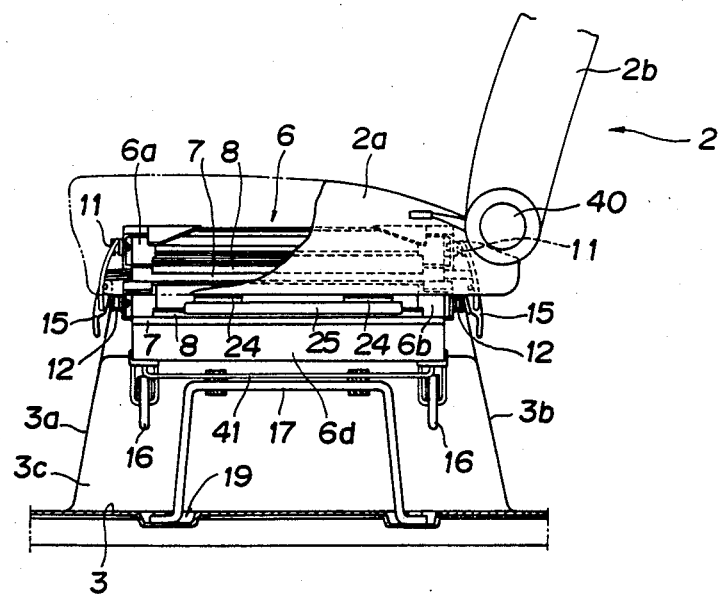
Figure 9:
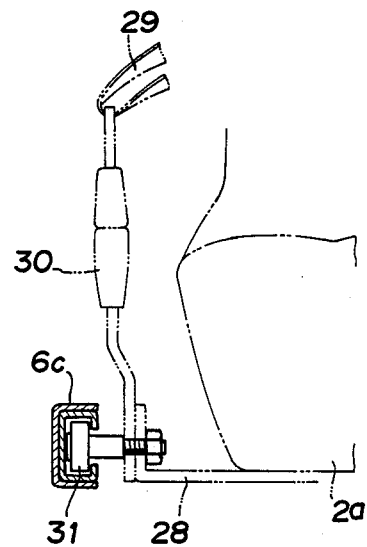

Specifically, the engine deck 4 is provided in the form of a trapezoidal structure by raising the central part of the floor 3 in the vehicle located intermediate between the driver's seat 1 and the assistant driver's seat 2 in such a manner that the trapezoidal structure includes four wall portions 3a to 3c standing upwardly from the floor 3 and a ceiling portion 3d bridged between the upper ends of the wall portions 3a to 3c. In addition, a space 61 required for allowing a passenger to move therethrough is provided on the floor 3 between an inner wall surface 60a located on the assistant driver's seat 2 side among inner wall surfaces defining the driver cabin 60 and the wall portion 3c of the engine deck 4 facing the inner wall surface 60a. As is best seen in FIG. 3, the service hole 21 is formed in the ceiling portion 3d for the purpose of inspecting and maintaining an engine, a radiator and other associated components of the vehicle. The ceiling 3d comprises a flat surface 3e and an inclined surface 3f gradually descending from the flat surface 3e toward the wall portion 3c facing the inner wall surface 60a, and the service hole 21 is formed in the inclined surface 3f. In fact, a space located above the service hole 21 in the interior of the driver cabin 60 serves as a working space when the assistant driver's seat 2 is turned upwardly by actuating the transverse leap-up mechanism.

The engine, radiator and so forth (each of them being not shown in the drawings) are arranged below the engine deck 4. The service hole 21 is closed with a service hole cover 5.

Front seats constituting the driver seat 1 and the assistant driver seat 2 (in the illustrating embodiment only the assistant driver's seat 2 being shown in FIG. 1 for the purpose of simplification of illustration) are arranged above the engine deck 4. Reference numeral 1a designates a seat cushion for the driver's seat 1 and reference numeral 1b does a seat back for the same. Similarly, reference numeral 2a designates a seat cushion for the assistant driver's seat 2 and reference numeral 2b does a seat back for the same. The seat 2 is equipped with a reclining mechanism 40 at its rear end part so that it can be inclined in forward/backward directions as viewed in the direction of running of the vehicle (hereinafter referred to as the longitudinal direction).

The assistant driver's seat 2 is mounted on the engine deck 4 in such a manner as to cover the space 61 required for allowing a passenger to move therethrough. However, to assure that a passenger can move through the space 61, the transverse displacement mechanism is so constructed that the assistant driver's seat 2 can be displaced toward the driver's seat 1 side in the direction of width of the vehicle (hereinafter referred to as the transverse direction). Namely, by virtue of the arrangement which will be described in more detail later, the assistant driver's seat 2 can be displaced from the illustrated position toward the driver's seat 1 side in the transverse direction. Additionally, the seat back 2b can be folded down on the seat cushion 2a by actuating the reclining mechanism 40. An arrangement is made such that the assistant driver's seat 2 is turned upwardly in a leap-up fashion about the pivot which is one end of the seat cushion 2a located adjacent to the driver's seat 1 while the seat back 2b is folded in that way.

FIGS. 3 to 9 illustrate in more detail how the transverse displacement mechanism, the transverse leap-up mechanism and the longitudinal slide mechanism are constructed for the assistant driver's seat 2.

According to this embodiment, the seat 2 is supported by means of a seat frame 6 placed between the bottom surface of the seat cushion 2a and the ceiling portion 3d of the engine deck 4 so as to allow the seat 2 to be displaced in both longitudinal and transverse directions of the vehicle.

An opposing pair of rollers 9 are secured to the ceiling portion 3d of the engine deck 4 via brackets 10. An axis of rotation of one roller 9 is located in alignment with that of the other roller 9 and the axis of rotation of the rollers 9 extends in parallel with the longitudinal direction of the vehicle. The seat frame 6 placed beneath the bottom surface of the seat cushion 2a constitutes a rectangular framework including a fore frame member 6a and a rear frame member 6b extending in the transverse direction and an opposing pair of side frame members 6c and 6d extending in the longitudinal direction to be connected to opposite ends of the fore and rear frame members 6a and 6c respectively. Incidentally, securing of the seat frame 6 to the engine deck 4 on the floor 3 is achieved in a symmetrical relationship as viewed in the direction of extension of the fore and rear frame members 6a and 6b, and the fore side of the seat frame 6 is identical in structure to the rear side thereof.

The fore and rear frame members 6a and 6b of the seat frame 6 are arranged in such a manner as to embrace the rollers 9 therein so that displacement and turning movements of the seat frame 6 are achieved with the aid of the rollers 9 which serve as guiding means.

Each of fore frame member 6a and rear frame member 6b include strikers 11 and 12 disposed in alignment with the rollers 9, and toggle clamps 15 adapted to be engaged with and disengaged from the strikers 11 and 12 are secured to the engine deck 4. When the toggle clamps 15 are brought into engagement with the strikers 11 and the seat cushion 2a is then raised in the upward direction, the assistant driver's seat 2 can be turned about the strikers 11.

More particularly, two column-shaped strikers 11 and 12 are secured to the front side of the fore frame member 6a in the proximity of the driver's seat 1. Other column-shaped strikers 11 and 12 are also secured to the rear frame member 6b in a symmetrical relationship with respect to those on the fore frame member 6a as viewed in the direction of extension of both the frame members 6a and 6b. In addition, the fore frame member 6a is provided with two hooks 13 and 14 on the bottom surface thereof at positions located on the side frame member 6d side, and rear frame member 6b is also provided with two similar hooks 13 and 14 in a symmetrical relationship with respect to those on the force frame member 6a. The distance between the strikers 11 and 12 is determined to be equal to the distance between the hooks 13 and 14.

The toggle clamp 15 is secured to the fore wall portion 3a of the engine deck 4 at a predetermined position thereon so that either of the strikers 11 and 12 on the seat frame 6 is engaged with the fore wall portion 3a via the toggle clamp 15. Additionally, a toggle clamp 16 is likewise secured to the side wall portion 3c of the engine deck 4 so that either of the hooks 13 and 14 on the seat frame 6 is engaged with the side wall portion 3c via the toggle clamp 16. The toggle clamps 15 and 16 are arranged in a symmetrical relationship as viewed in the direction of extension of the fore and rear frame members 6a and 6b.

Each of the strikers 11 attached to first ends of the fore and rear frame members 6a and 6b in the proximity of the central part of the engine deck 4 along the transverse direction are fixed to the engine deck 4 via the toggle clamps 15 secured to the fore wall portion 3a and the rear wall portion 3b of the engine deck 4 on the floor 3. Each of the hooks 13 secured to predetermined positions of the bottom surfaces of the fore and rear frame members 6a and 6b are fixed to the side wall portion 3c via the toggle clamps 16 attached to the side wall portion 3c. A pipe member 41 extending beneath of the bottom surface of the side frame member 6d in the longitudinal direction of the vehicle is supported by means of a stand 17 which is turnably held in a recess 19 formed sideward of the side wall portion 3c at predetermined positions in the floor 3, whereby the whole seat frame 6 is supported immovably relative to the vehicle (floor 3) in the illustrated state. Fore frame member 6a and rear frame member 6b extend outwardly from the engine deck 4 toward the space 61 above the floor 3, and the side frame member 6d connected to the ends of fore frame member 6a and rear frame member 6b is supported on the floor 3 via the stand 17. The stand 17 is provided to be engageable with and disengageable from the side frame member 6d or the floor 3.

Fore frame member 6a and rear frame member 6b are formed with respective roller grooves 6e, so that the rollers 9 received in the roller grooves 6e may slidably support the fore frame member 6a and rear frame member 6b on the engine deck 4. Since first ends of the fore frame member 6a and the rear frame member 6b, i.e. The end parts thereof located in the proximity of the central part of the engine deck 4 as viewed in the transverse direction of the vehicle, are respectively supported on the engine deck 4 via the pair of rollers 9 rotatably held by the brackets 10 secured to the engine deck 4, the fore frame member 6a and the rear frame member 6b are supported on the vehicle (floor 3) to be displaceable in the transverse direction.

The operative state in which the strikers 11 are engaged with the engine deck 4 via the toggle clamps 15 and the hooks 13 are engaged with the same via the toggle clamps 16 is representative of a normal operative state to be assumed by the assistant driver's seat 2. While the foregoing operative state is maintained, the stand 17 disposed at the floor 3 stands upright to support the side frame member 6d from below. The stand 17 an be transversely turned down on the floor 3 by brackets 18 functioned as hinge means. To this end, the floor 3 is formed with the recess 19 into which the folded stand 17 is received.

A plurality of rubber members 20, adapted to abut against predetermined positions of the bottom surface of the fore frame member 6a to support the entire seat frame 6, are attached to predetermined position of the ceiling portion 3d of the engine deck 4. In addition, each of the strikers 12 adapted to be engaged with the toggle clamps 15 are secured to the front surface of the fore frame member 6a and the back surface of the rear frame member 6b at predetermined positions to firmly hold the seat frame 6 when the seat frame 6 is displaced in the transverse direction.

With the above construction, the entire seat frame 6 can be inclined about the rollers 9 in the transverse direction when the hooks 13 are disengaged from the toggle clamps 16 on the side wall surface 3c and the strikers 11 are still in an engaged state with the toggle clamps 15. This permits the service hole 21 on the engine deck 4 to be exposed to the outside for the purpose of inspecting and maintaining the engine, radiator and so forth arranged beneath the service hole 21.

While the aforementioned operative state of the assistant driver's seat 2 is maintained, the centers of the column-shaped strikers 11 are located in alingment with the axes of rotation of the rollers 9. In a case where the engine and other components are to be inspected, the assistant driver's seat 2 is turned upwardly in the transverse direction from this operative state in the following manner. First, the seat back 2b is folded down on the seat cushion 2a. Next, two toggle clamps 16 are released from the engaged state so that the hooks 13 are disengaged therefrom. When the left-hand end of the seat cushion 2a (situated on the door side) are raised up while the foregoing state is maintained, the rollers 9 and the column-shaped strikers 11 become a fulcrum for turning movement of the assistant driver's seat 2, whereby the seat frame 6 (indicative of the entire assistant driver's seat 2) is turned upwardly toward the driver's seat 1 side in the direction identified by an arrow mark C in FIG. 7. This causes the cover 5 of service hole 2 which has been concealed with the assistant driver's seat 2 to be exposed to the outside. Then, the cover 5 is removed to inspect the engine and other components accommodated in the interior of the engine deck 4. It should be noted that the stand 17 is folded downwardly at this time.

On the other hand, in a case where it is required that the assistant driver's seat 2 assumes a walk-through state by displacing it toward the driver' seat 1 side from its operative state as described above, the operations are performed in the following manner.

First, the two toggle clamps 15 are disengaged from the strikers 11 and the two toggle clamps 16 are then disengaged from the hooks 13. The seat frame 6 then is in an inoperative state in which the seat frame 6 is engaged only with two rollers 9, and the seat frame 6 is released from the floor 3. Then, when the assistant driver's seat 2 is pushed toward the driver's seat 1 side in the direction identified by an arrow mark D in FIG. 7, the seat frame 6 (indicative of the entire assistant driver's seat 2) is displaced to the driver's seat 1 side with the aid of the rollers 9 which serve as guiding means. On completion of the displacement of the seat frame 6 by a predetermined distance in the transverse direction, the strikers 12 reach the position which has been occupied by the toggle clamps 15 and at the same time the hooks 14 reach the position which has been occupied by the toggle clamps 16. Then, the toggle clamps 15 are engaged with the strikers 12 and the toggle clamps 16 are engaged with the hooks 14. At this time, the stand 17 is folded downwardly on the floor 3. Thereby, the entire assistant driver's seat 2 is held immovably in an inoperative state in which the assistant driver's seat 2 has been displaced from the normal operative state toward the driver's seat 1 side. As a result, the wide open space 61 required for allowing a passenger to move therethrough is provided between the assistant driver's seat 2 and the inner wall surface 60a situated on the assistant driver's seat 2 side (door side). Accordingly, a driver can move through this space 61 to enter a cargo room situated behind the driver cabin 60.

In this manner, the fore frame member 6a and the rear frame member 6b constituting the seat frame 6 are supported via the rollers 9 in such a manner that they are displaceable in the transverse direction. Thus, by disengaging the toggle clamps 15 from the strikers and moreover disengaging the toggle clamps 16 from the hooks, the seat frame 6 can be displaced in the transverse direction to the position represented by chain lines in FIG. 7. This arrangement makes it possible to displace the seat cushion 2a not only in the longitudinal direction but also in the transverse direction. Consequently, displacement of the seat cushion 2a is achieved in a multi-directional manner. This makes it easier and smoother for a passenger to move from the driver cabin 60, including a front seat such as an assistant driver's seat 2 or the like, to enter the cargo room situated behind the driver cabin 60 while the front seat is displaced away from the space 61 in the transverse direction.

Further, the seat frame 6 is provided with a longitudinal slide mechanism for slidably displacing the assistant driver's seat 2 in the longitudinal direction. A pair of longitudinally extending lower rails 8 are arranged between the pair of side frame members 6c and 6d. Additionally, a pair of upper rails 25 adapted to be engaged with the lower rails 8 to slidably displace the assistant driver's seat 2 are attached to the bottom surface of the seat cushion 2a. The lower rails 8 are bridged between the pair of fore frame member 6a and rear frame member 6b in the longitudinal direction. Specifically, the pair of upper rails 25 attached to the bottom surface of the seat cushion 2a via a plurality of brackets 24 are slidably engaged with the pair of lower rails 8 fixed to guide members 7 bridged between the upper surface of the fore frame member 6a and the upper surface of the rear frame member 6b in the longitudinal direction. This allows the entire seat cushion 2a to be displaced in the longitudinal direction. It should be added that a hitherto known stopper mechanism (not shown) for immovably holding the seat cushion 2a at a position to be assumed thereby when the seat cushion 2a is displaced in the longitudinal direction to adjust its position as required is provided between the lower rails 8 and the upper rails 25.

By virtue of such arrangement, the seat cushion 2a is longitudinal slidably supported by allowing the pair of upper rails 25 attached to the bottom surface of the seat cushion 2a to be slidably engaged with the pair of lower rails 8 fixed to the upper surface of the seat frame 6.

On the other hand, the seat cushion 2a is provided with a seat belt anchor 30 which is associated with an engagement member 31, and the engagement member 31 is slidably supported by the side frame member 6c. As is apparent from the drawings, the engagement member 31 is secured to the bottom surface of the seat cushion 2a via a bracket 28, is integrally joined to the seat belt anchor 30, to which one end of a seat belt 29 may be connected, and is slidably received in the side frame member 6c. This permits the seat belt anchor 30 to be displaced in the longitudinal direction along with the seat cushion 2a whereby a load exerted on the seat belt 29 is reliably sustained on the vehicle side (floor 3 side) without the occurrence of degrading of fitting of the seat belt 29, because any load exerted on the seat belt 29 is effectively transmitted to the side frame member 6c via the engagement member 31 which is integrally joined to the seat belt anchor 30.

Next, description will be made below with reference to FIGS. 10 to 13 of a vehicular seating apparatus in accordance with a second embodiment of the present invention.

A seat frame includes a flat plate-shaped panel member adapted to cover the service hole 21 while closing therewith an inner open space which is defined by a pair of fore and rear frame members and a pair of side frame members. In this embodiment, the seat frame is constructed in the form of a seat panel 42 and the respective frame members are constituted by a side frame 45 and frame portions 42a to 42c which are made integral with the seat panel 42.

The side frame portion 42c situated in the proximity of the driver's seat 1 is hinged to the engine deck 4, and fore frame portion 42a and rear frame portion 42b are respectively constituted by a casing portions 42f located on the engine deck 4 and extension portions 42g adapted to extend outwardly from the engine deck 4 toward a space 61 required for a passenger to move therethrough. The extension portions 42g are hinged to the casing portions 42f via hinge members 44 so that they are folded there about toward the casing portions 42f.

The hinge members 44 by way of which the extension portions 42g are turnably connected to the casing portions 42f are disposed on the ceiling portion 3d of the engine deck 4, and the side frame 45 extending between the extension portions 42g is removably attached via engaging means 46 to the side wall portion 3c facing the inner wall surface 60a situated on the assistant driver's seat 2 side.

Figure 10:
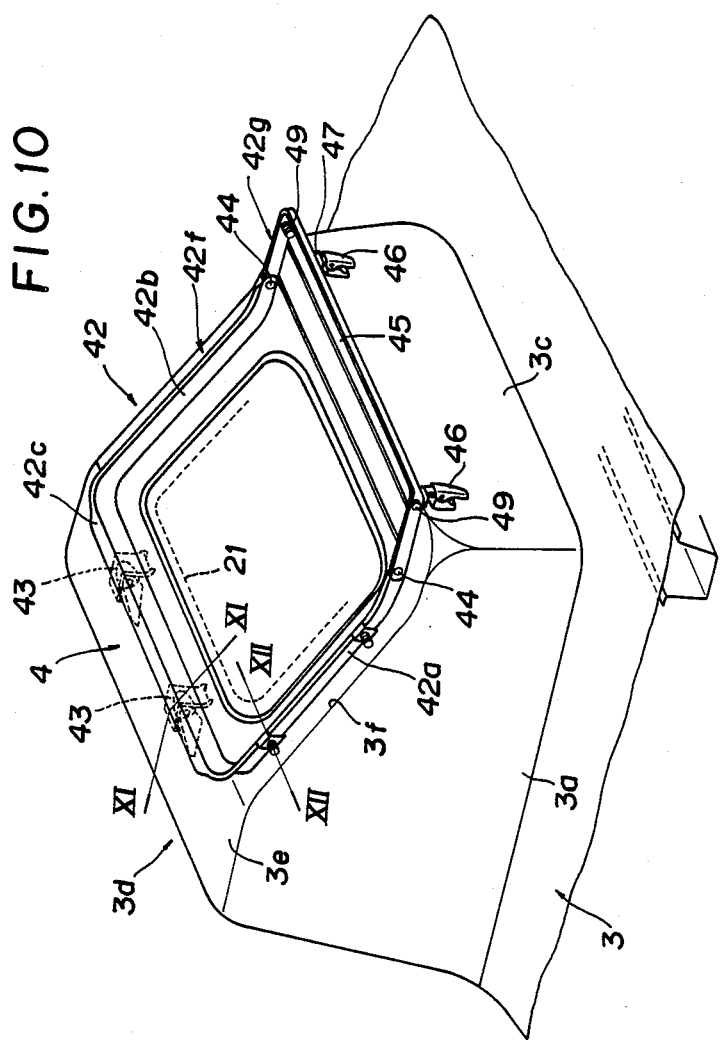
FIGS. 10 to 13 illustrate in more details a transverse displacement mechanism and a transverse leap-up mechanism which constitute a vehicular seating apparatus in accordance with a second embodiment of the present invention.
Figure 11:
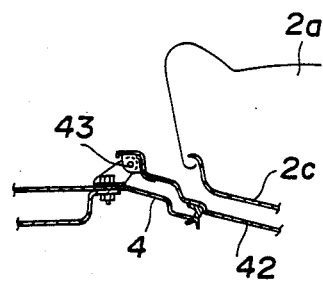
Figure 12:
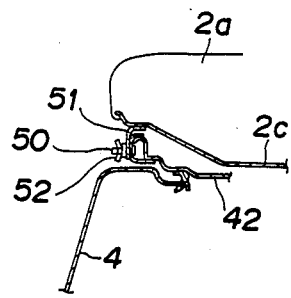
Figure 13:
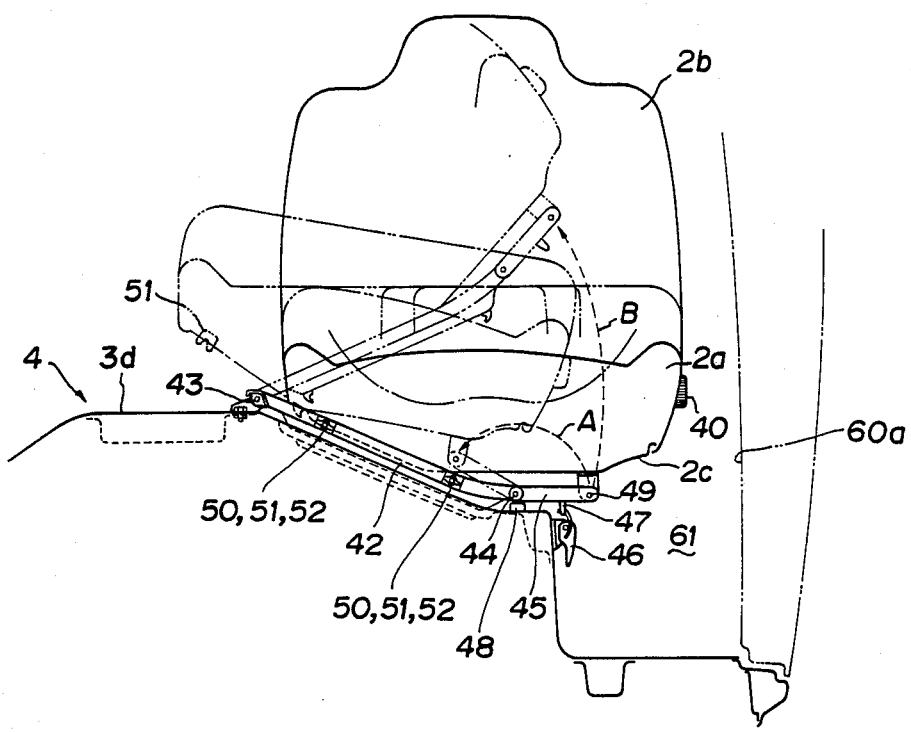

Referring to FIG. 10, the ceiling portion 3d of the engine deck 4 raised upwardly from the central part of floor 3 includes inclined surface 3f which is formed with service hole 21, and the seat panel 42 serving also as a cover for the service hole 21 is hinged to the ceiling portion 3d of the engine deck 4 via hinges 43. The axes of the hinges 43 extend in parallel with the longitudinal direction of the vehicle.

As is apparent from the drawings, the side frame 45 is hinged to the left-hand end of the seat panel 42 via hinge members 44. The axes of the hinge members 44 extend in the longitudinal direction. The seat panel 42 and the side frame 45 serve as a seating member by way of which the assistant driver's seat 2 is mounted on the vehicle.

Two toggle clamps 46 are fixedly attached to the side wall portion 3c of the engine deck 4 so that hooks 47 on the bottom surface of the side frame 45 are engaged with the side wall portion 3c via the toggle clamps 46.

While the toggle clamps 46 are brought into an engaged state by with the hooks 47 on the side frame 45, the right-hand end of the seat panel 42 is secured to the vehicle via the hinges 43, the hinge members 44 at the left-hand end of the seat panel 42 come into contact with rubber members 48 on the engine deck 4, and the side frame 45 is fixedly attached to the side wall portion 3c via the toggle clamps 46. The seat cushion 2a of the assistant driver's seat 2 is placed on the side frame 45 and the seat panel 42 so that the seat cushion 2a is supported thereon so as to turn about hinge portions 49 at the left-hand end of the side frame 45. Additionally, the seat panel 42 includes a plurality of lock bolts 50 each of which is engaged with a bifurcated part of a lock plates 51 secured to the bottom surface of the seat cushion 2a. Thus, by tightening the lock plates 51 with lock nuts 52 in cooperation with the lock bolts 50, the seat cushion 2a is fixed to the seat panel 42. This fixed state is representative of a normal operative state of the assistant driver's seat 2.

When the lock nuts 52 are loosened, the lock plates 51 are released. At this moment, the seat cushion 2a is connected to the seat panel 42 only via the hinge portions 49 at the left-hand end of the side frame 45. Then, when the toggle clamps 46 are disengaged from the hooks 47, the seat panel 42 is joined to the engine deck 4 via the hinges 43 at the left-hand end thereof.

Thereafter, when the seat cushion 2a is pushed toward the driver's seat 1 side with its left side slightly lifted while it is released from the aforementioned fixed state, the side frame 45 is folded about the hinge members 44 which represent joint points at which the seat panel 42 is joined to the side frame 45, as shown by an arrow A, and thereby the seat cushion 2a is displaced toward the driver's seat 1 side away from the seat panel 42. As a result, an open space 61 required for allowing a passenger to move therethrough is provided on the left side of the seat cushion 2a so that a driver can move therethrough to enter a cargo room from the driver cabin 60.

While the seat cushion 2a is fixed to the seat panel 42 using the lock bolts 50, the lock plates 51 and the lock nuts 52, the toggle clamps 46 may be disengaged from the hooks 47. Then, when the left-hand end of the seat cushion 2a is lifted up to a large extent, the seat cushion 2a, the seat panel 42 and the side frame 45 are united with each other, so that the united assembly can be transversely leaped up by turning movement thereof about the hinges 43 at the right-hand end of the seat panel 42 as shown by an arrow B. This causes the service hole 21 which has been closed by the seat panel 42 to be opened whereby the engine and other components can be inspected through the service hole 21.

As described above, the vehicular seating apparatus is so constructed that the assistant driver's seat 2 disposed above the service hole 21 of the engine deck 4 can be offset toward the driver's seat 1 side by displacing it in the transverse direction. With this construction, a space 61 through which a passenger can freely move between the assistant driver's seat 2 and the inner wall surface 60a situated on the assistant driver's seat 2 side (the door side) is provided so that a driver can enter the rear part of the vehicle from the driver cabin 60 by moving through the space 61. This means that a cab-over type vehicle having an assistant driver's seat 2 can be used in the same fields of utilization as a walk-through type panel van. Further, since the seating apparatus is constructed such that the assistant driver's seat 2 can be turned upwardly toward the driver's seat 1 side, various service operations can be performed for the engine and other components in the wide open space situated on the assistant driver's seat 2 side. Other advantageous effects of the present invention are that the vehicular seating apparatus also has the ability of allowing the seat 2 to be displaced in the longitudinal direction while maintaining good walk-through performance and good engine service performance and moreover it provides excellent riding comfort.

According to the present invention, the vehicular seating apparatus is provided with a seat frame for supporting the seat cushion 2a of a seat in such a manner as to enable it to be displaced in the longitudinal direction as well as a transverse displacement mechanism for supporting the seat cushion 2a engaged with the seat frame in such a manner as to enable it to be displaced in the transverse direction. Thus, displacement of the seat cushion 2a can be achieved in a multi-directional fashion. Further, since a side frame member of the seat frame is adapted to slidably support an engagement member 31 of a seat belt anchor 30 associated with the seat cushion 2a, there is no fear that fitting of the seat belt 29 will be degraded and moreover any load exerted on the seat belt 29 can be reliably sustained on the vehicle side.

While the present invention has been described above merely with respect to two preferred embodiments, it should of course be understood that the invention should not be limited only to such embodiments, and that various changes or modifications may be suitably made without departure from the scope of the invention as defined by the appended claims.

What is claimed is:

1. A vehicular seating apparatus including an assistant driver's seat mounted in the interior of a driver cabin of a vehicle and above a service hole on an engine deck raised at the central part of a floor sideward of a driver's seat, wherein said apparatus includes:

a transverse displacement mechanism for displacing said assistant driver's seat in the transverse direction of the vehicle, and a transverse leap-up mechanism for upwardly turning the assistant driver's seat about a pivot which is at an end of a seat cushion of the assistant driver's seat situated on the side of the driver's seat.

2. The vehicular seating apparatus as claimed in claim 1, wherein said engine deck is configured in the form of a trapezoidal structure including four side wall portions raised upwardly from said floor and a ceiling portion bridged between upper ends of said side wall portions, a space required for allowing a passenger to move therethrough is provided on the floor between an inner wall surface situated on the assistant driver's seat side among inner wall surfaces defining said driver cabin and one said side wall portion of said engine deck facing said inner wall surface, and said service hole is formed in said ceiling portion of the engine deck.

3. The vehicular seating apparatus as claimed in claim 2, wherein said ceiling portion includes a flat surface and an inclined surface gradually descending from said flat surface toward said one side wall portion facing the inner wall surface situated on the assistant driver's seat side, and said service hole is formed in said inclined surface of the ceiling portion of the engine deck.

4. The vehicular seating apparatus as claimed in claim 3, wherein a space in the interior of the driver cabin and above said service hole becomes a working space when the assistant driver's seat is turned upwardly by actuating said transverses leap-up mechanism.

5. The vehicular seating apparatus as claimed in claim 2, wherein a seat frame is positioned below the bottom surface of said seat cushion, and said seat frame is configured in the form of a rectangular framework including a fore and rear frame members extending in the transverse direction of the vehicle and a pair of side frame members extending in the longitudinal direction of the vehicle and connected to respective opposite ends of said fore and rear frame members.

6. The vehicular seating apparatus as claimed in claim 5, wherein said seat frame includes a flat plate-shaped panel member closing an inner space defined by said fore and rear frame members and said pair of said frame members and covering said service hole.

7. The vehicular seating apparatus as claimed in claim 5, wherein said seat frame is provided with a longitudinal slide mechanism for slidably displacing the assistant driver's seat in the longitudinal direction of the vehicle.

8. The vehicular seating apparatus as claimed in claim 7, wherein said seat cushion is provided with a seat belt anchor which includes an engagement member which is slidably held in one of said side frame members.

9. The vehicular seating apparatus as claimed in claim 5, wherein said fore and rear frame members have extensions extending outwardly from the engine deck toward the space required for allowing a passenger to move therethrough, and one of said pair of side frame members is connected to the outermost ends of said extensions of said fore and rear frame members and is supported on the floor via a stand.

10. The vehicular seating apparatus as claimed in claim 9, wherein said stand is disposed in such a manner as to be engaged with and disengaged from said one side frame member or the floor, said fore and rear frame members are formed with roller grooves, and rollers engaged with said roller grooves to slidably support said fore and rear frame members are provided on the engine deck.

11. The vehicular seating apparatus as claimed in claim 10, wherein said fore and rear frame members are provided with strikers which are located in alignment with said rollers, and the engine deck is provided with toggle clamps adapted to be engaged with and disengaged from said strikers so that the assistant driver's seat can be turned about said strikers by upwardly raising the seat cushion while said toggle clamps are engaged with said strikers.

12. The vehicular seating apparatus as claimed in claim 5, wherein one of said side frame members situated on the side of the driver's seat is hinged to the engine deck, each of said fore and rear frame members comprises a casing portion located above the engine deck and extensions extending outwardly from the engine deck toward the space required for allowing a passenger to move therethrough, and said extensions are joined to said casing portions via hinge members to assure that said extensions can be folded toward said casing portions.

13. The vehicular seating apparatus as claimed in claim 12, wherein said hinge members by way of which said extensions are turnably joined to said casing portions are placed on said ceiling portion of the engine deck, and one said side frame member is bridged between said extensions and is detachably secured via engaging means to one of said wall portions constituting the engine deck facing the inner wall surface situated on the assistant driver's seat side.

14. The vehicular seating apparatus as claimed in claim 5, wherein longitudinally extending slide guides are arranged between said fore and rear frame members, and guides engaged with said longitudinally extending slide guides are secured to the bottom surface of the seat cushion of the assistant driver's seat.

15. The vehicular seating apparatus as claimed in claim 14, wherein said longitudinally extending slide guides are bridged between said fore and rear frame members in the longitudinal direction of the vehicle.

16. The vehicular seating apparatus as claimed in claim 2, wherein the assistant driver's seat is mounted above the engine deck in such a manner as to cover the space required for allowing a passenger to move therethrough, and said transverse displacement mechanism is actuated to displace the assistant driver's seat toward the driver's seat in the transverse direction of the vehicle, so that a passenger can move through said space which thus has been opened by displacement of the assistant driver's seat in that direction.

17. A vehicular seating apparatus comprising:
a seat mounted in the interior of a driver cabin of a vehicle and above a service hole in an engine deck raised at the central part of a floor;
a seat frame disposed for the seat in order to longitudinally displaceably support a seat cushion of the seat, said seat frame comprising a pair of fore and rear frame members extending in the transverse direction of the vehicle and a pair of side frame members extending in the longitudinal direction of the vehicle and connected to opposite ends of said fore and rear frame members;
a transverse displacement mechanism engaged with said fore and rear frame members to slidably support the seat cushion for movement in the transverse direction of the vehicle;
a transverse leap-up mechanism for upwardly turning the seat about a pivot at one end of the seat cushion;
a seat belt anchor secured to the seat cushion; and an engagement member for said seat belt anchor and slidably received in one of the side frame members.

18. The vehicular seating apparatus as claimed in claim 17, wherein said engine deck is configured in the form of a trapezoidal structure including four wall portions raised upwardly from said floor and a ceiling portion bridged between upper ends of said wall portions, a space required for allowing a passenger to move therethrough is provided on the floor between a side wall surface defining the driver cabin as viewed in the transverse direction of the vehicle and one said side wall portion facing said side wall surface, and said service hole is formed in said ceiling portion.

19. The vehicular seating apparatus as claimed in claim 18, wherein the seat is mounted on the engine deck while covering said space required for allowing a passenger to move therethrough, and said transverse displacement mechanism is actuated to displace the seat toward an adjacent seat in the transverse direction of the vehicle in order to open said space so that a passenger can move therethrough.

20. The vehicular seating apparatus as claimed in claim 17, wherein a space situated above said service hole in the interior of the driver cabin becomes a working space when the seat is turned upwardly by actuating said transverse leap-up mechanism.

* * * * *